United States Patent [19]

Matsui

[11] Patent Number: 4,562,807
[45] Date of Patent: Jan. 7, 1986

[54] DIRECT INJECTION TYPE INTERNAL COMBUSTION ENGINE

[75] Inventor: Yukio Matsui, Yokosuka, Japan

[73] Assignee: Nissan Motor Co., Ltd., Yokohama, Japan

[21] Appl. No.: 605,106

[22] Filed: Apr. 30, 1984

[30] Foreign Application Priority Data

May 4, 1983 [JP] Japan .................. 58-78624

[51] Int. Cl.$^4$ .......... F02B 23/06; F02B 23/00
[52] U.S. Cl. .................. 123/276; 123/261; 123/270; 123/288; 123/260
[58] Field of Search ........ 123/276, 261, 270, 288, 123/279, 260

[56] References Cited

U.S. PATENT DOCUMENTS

| | | | |
|---|---|---|---|
| 3,020,898 | 2/1982 | Hartmann | 123/276 |
| 3,112,738 | 12/1963 | Morris | 123/276 |
| 3,209,735 | 10/1965 | Clarke | 123/276 |
| 3,954,089 | 5/1976 | Hardesty et al. | 123/276 |
| 4,108,116 | 8/1978 | Ohta | 123/276 |
| 4,428,340 | 1/1984 | Nikly | 123/276 |

*Primary Examiner*—Raymond A. Nelli
*Attorney, Agent, or Firm*—Schwartz, Jeffery, Schwaab, Mack, Blumenthal & Evans

[57] ABSTRACT

The present invention features a modified Saurer type direct injection Diesel engine wherein the fuel injector is offset to one side of the cylinder bore axis and a lip is provided about the upper periphery of the cavity which generates a sufficiently strong squish and reverse squish as to entrain and disperse the fuel (viz., macro-mix) which is injected along the forshortened injection trajectories and prevent wetting of the cavity wall. The lip is further arranged to permit the finely divided low inertia and kinetic energy fuel droplets (micro-mixed) of the fuel which is injected along the elongate injection trajectories to be drawn out of the cavity under the influence of the reverse squish and thus obviate any delay in combustion.

7 Claims, 16 Drawing Figures

DIRECT INJECTION TYPE INTERNAL COMBUSTION ENGINE

BACKGROUND OF THE INVENTION

1. Field of the Invention

The present invention relates to an internal combustion engine of the direction injection type and more specifically to a Saurer type direct injection Diesel engine which features a unique cavity and fuel injector arrangement.

2. Description of the Prior Art

In Saurer type engines (see FIG. 1) a problem is encountered in that it is difficult to simultaneously use large diameter inlet and exhaust valve and dispose the fuel injector nozzle coaxially with the cylinder bore axis. Accordingly, various attempts have been made to offset the fuel injector and modify the location of the toroidal cavity into which the fuel is injected in an effort to relieve the crowding problem while providing desirable performance characteristics. However, until now none of these efforts have proved satisfactory.

Japanese Patent Application Second Provisional Publication No. 56-7494 (shown in FIGS. 2 and 3 of the drawings) discloses one example of the above mentioned proposals. This arrangement includes a cylinder bore 1 (having an axis $O_1$) a piston 2 reciprocatively disposed therein, a toroidal cavity 3 formed in the crown of the piston, a cylinder head 4 which closes the cylinder bore 1 to define a variable volume combustion chamber and a fuel injector 5 disposed in the cylinder head 4 and arranged to inject fuel into the cavity 3. In this arrangement the fuel injector 5 is of the type having a nozzle formed with four injection apertures or ports each arranged at 90 degree intervals. As shown in FIG. 1, the injector is arranged so that the nozzle thereof is coaxial with the axis of rotation of the toroidal cavity. Viz., the axes $O_2$ and $O_3$ of the injector and the cavity are aligned.

FIGS. 4 to 6 show the evolution of the just described arrangement from what shall be termed an "O" type arrangement (see FIG. 1 for example) wherein the centre of the fuel injection nozzle $O_2$, axis of rotation of the toroidal cavity $O_3$ and the axis of cylinder bore $O_1$ are all aligned.

FIG. 4 shows what shall be referred to as an "A" type arrangement. In this arrangement the cavity 3 is formed in middle of the piston crown so that the axis of rotation thereof is coincident with the cylinder bore axis $O_1$ and the centre of the fuel injector nozzle $O_2$ offset as shown. This arrangement while being simple has suffered from the drawback that the fuel injected along trajectories $T_1$ and $T_2$ has insufficient time to atomize and tends to wet the walls of the cavity 3. To overcome this it was subsequently proposed as shown in FIG. 5 (viz., type B) to offset the cavity so that the axis of rotation of the cavity $O_3$ and the center of the injection nozzle $O_2$ were coincident and thus equalize the lengths of the trajectories followed by the fuel. However, with this modification (i.e. type B) a problem was encountered in that the flow patterns within the cavity due to squish and reverse squish effects are not symmetrical as required.

To overcome this problem it was subsequently proposed as shown in FIG. 6 (viz., type C) to add a lip 6 which corrected the asymmetrical flow patterns. As will be understood this "C" type arrangement of FIG. 6 corresponds to that shown in FIGS. 2 and 3.

Experiments conducted with the above mentioned "O", "A", "B" and "C" type engines revealed that:

When the offset of the axis of rotation of the cavity $O_3$ relative to the cylinder bore diameter is approximately 6% or less, the performance of the engine differs very little from that of the "O" type.

When the offset of the fuel injector nozzle center $O_2$ from the axis of rotation of the cavity $O_3$ with respect to the diameter of the cavity (referred to as "first nozzle excentricity" hereinafter) is 10–12% or less the power output performance of the engine is scarcely effected.

In general a compromise may be struck between maximizing fuel flight trajectory length and squish-/reverse squish strength by setting the cavity diameter approximately 50% of the cylinder bore diameter and the first nozzle excentricity at 5–6%.

With the "A" type engine when the offset of the fuel injector nozzle $O_2$ from the cylinder bore axis $O_1$ with respect to the diameter of the cylinder bore (referred to as "second nozzle eccentricity" hereinafter) is 6% or less the power output deviates very little from that of the "O" type engine, as shown in FIG. 10. Under the same conditions, the "B" type engine exhibits the same performance characteristics. The provision of the lip in the "C" type engine improves the output a little, as shown.

In the case that the second nozzle excentricity is more than 6% and the cavity offset in a manner that the axis of rotation $O_3$ thereof is aligned with the center of the injector nozzle $O_2$ such as shown in FIG. 7 (viz., "D" type) the output performance of the engine falls off markedly. However, with the provision of squish-/reverse squish correcting lip 6 ("E" type) shown in FIG. 8 the performance of the engine is notably improved.

If the offset of the cavity is less than that of the fuel injector nozzle, wherein the first nozzle excentricity is 12% or less and the cavity is offset by 6% of the bore diameter (see "F" type in FIG. 9) the performance is slightly deteriorated as compared with the "E" type.

Thus, in summary, even if the second nozzle excentricity exceeds 6% a sharp deterioration in performance characteristics can be prevented by employing "E" of "F" type arrangements, but it is impossible to obtain any notable improvement over the basic "O" type. This is especially so when the second nozzle excentricity exceeds 11–12% in the "E" and "F" type arrangements.

Further disclosure regarding the above mentioned "E" and "F" type arrangements may be had with reference to FIGS. 4 and 2 respectively, of Japanese Utility Model First Provisional Publication No. 57-36324.

SUMMARY OF THE INVENTION

It is an object of the present invention to provide an arrangement wherein the fuel injector can be offset from the cylinder bore axis to alleviate the crowding experienced with the basic Saurer type arrangement and which simultanously provides improved power output performance charateristics.

In brief, the above object is fullfilled by offsetting the fuel injection nozzle toward one side of the toroidal cavity and providing a lip arrangement about the upper periphery of the cavity which causes the fluid flow within the cavity produced by the squish and reverse squish phenomena to be sufficiently strong as to entrain and disperse (macro-mix) all of the fuel flowing along the foreshortened fuel injection trajectories and thus prevent wetting of the cavity wall, while permitting the fuel injected along the longer injection trajectories which tends to be micro-mixed and which accordingly posses little kinetic energy and inertia, to be readily withdrawn from the cavity under the influence of the reverse squish phenomenon.

More specifically, the present invention takes the form of an internal combustion engine which features: a bore having an axis, a piston reciprocatively disposed in the bore, a cavity formed in the crown of the piston, the cavity having an axis, a fuel injector for injecting fuel into the cavity, the fuel injector including a nozzle having a center, the nozzle being offset from the axis of the bore in a manner that the axis of the bore and the center of the nozzle lie on a first plane which normally intersects a second plane which includes the axis of the cavity and which second plane does not intersect the center of the nozzle, and an inwardly extending lip formed about the upper periphery of the cavity, the lip having a center which is located on the opposite side of the second plane with respect to the center of the fuel injection nozzle.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 11:
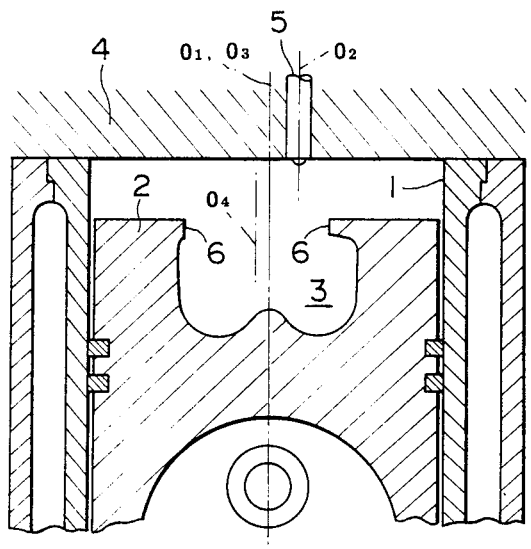
FIGS. 11 and 12 show a first embodiment of the present invention.
Figure 12:
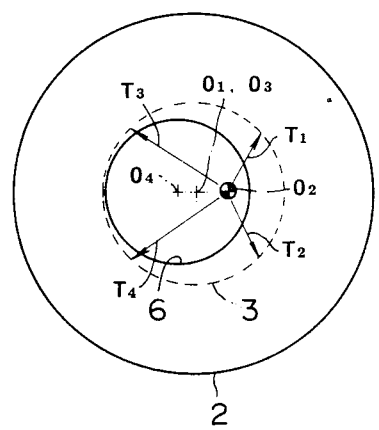

FIGS. 11 and 12 show a first embodiment of the present invention. In this arrangement the toroidal cavity 3 is arranged so that the axis of rotation $O_3$ thereof is coincident with the cylinder bore axis $O_1$, the fuel injector 5 is arranged so that the nozzle thereof is located diametrically opposite the center of an inwardly extending lip 6 which throttles the opening of the cavity 3. That is to say, the center of the lip $O_4$, and that of the fuel injection nozzle $O_2$ lie on a first plane which intersects the cylinder bore axis $O_1$ and on opposite sides of a second plane which normally intersects the first plane and which includes the axis of the toroidal chamber.

In this embodiment the second nozzle eccentricity is 6% or less, the cavity eccentricity 0% and the first nozzle eccentricity accordingly 12% or less. It will be noted that these factors alone ensure that the power output deterioration will be relatively small. Further, as the location of the fuel injector is such that two of the fuel injection trajectories $T_1$, $T_2$ will be relatively short, the tendancy for fuel to impinge on and wet the cavity wall is, very high. However, the location of the lip 6 is such that a strong squish and reverse squish are produced in this zone and the fuel injected along the shorter trajectories $T_1$, $T_2$ is entrained in the air vortexes and suitably macro-mixed. This prevents any wetting from taking place.

With the present invention, care must be taken to ensure that the degree to which the lip projects on the side of the cavity toward which fuel flows along the longer injection trajectories $T_3$, $T_4$ is not made so long as to inhibit the escape of the very finely mixed (micro-mixed) fuel droplets which tend to be produced on that side of the cavity. Viz., during the mixing process which results in these very finely disperesd droplets, most of the kinetic energy imparted to the fuel during the injection is spent in the mixing process and due to their small mass inherently possess little inertia, whereby upon ignition of the charge the emission of the resulting flame from the cavity is apt to be delayed irrespective of the reverse squish which tends to be intensively generated at approximately 15 to 25 degrees after TDC.

Figure 1:
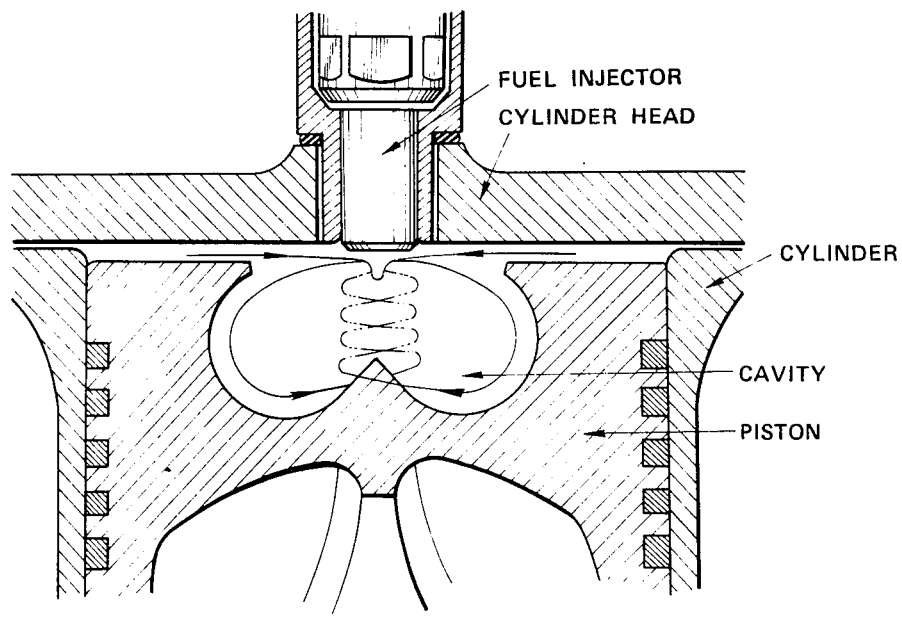
FIG. 1 is a sectional elevation of the basic Saurer type direct injection type Diesel engine.
Figure 2:
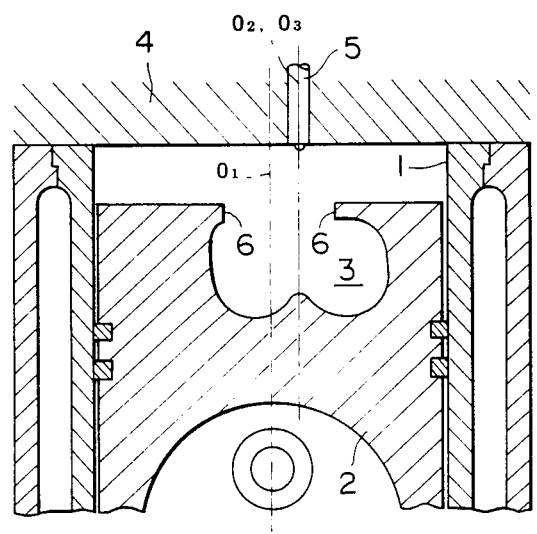
FIG. 2 is a sectional elevation of a prior art modification of the above type of engine arrangement wherein the fuel injector is offset with respect to the cylinder bore axis and an asymmetrical lip formed about the upper periphery of the toroidal cavity thereof.
Figure 3:
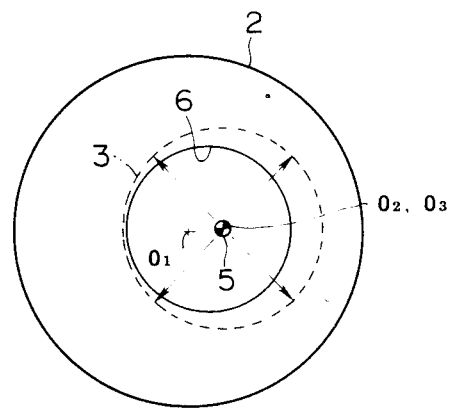
FIG. 3 is schematic plan view of the arrangement shown in FIG. 2.
Figure 4:
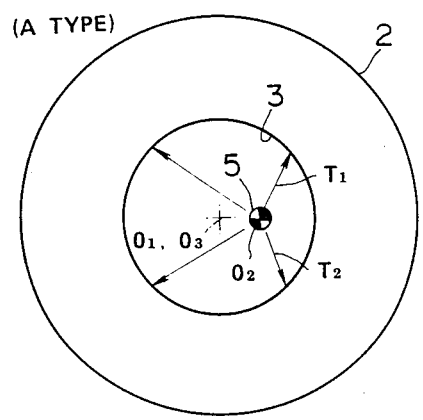
FIGS. 4 to 9 shows respectively the "A", "B", "C", "D", "E" and "F" types of arrangements discussed in the opening paragraphs of the present application.
Figure 5:
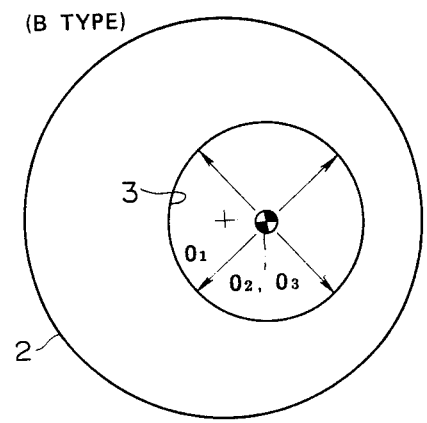
Figure 6:
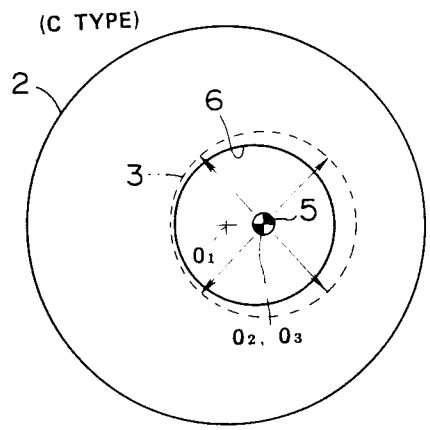
Figure 7:
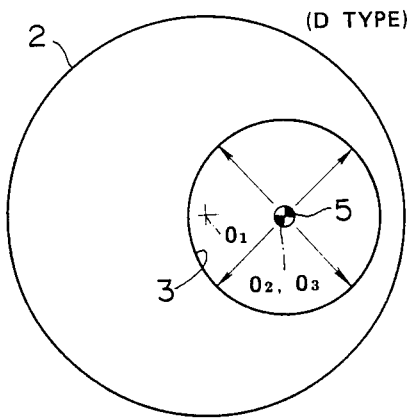
Figure 8:
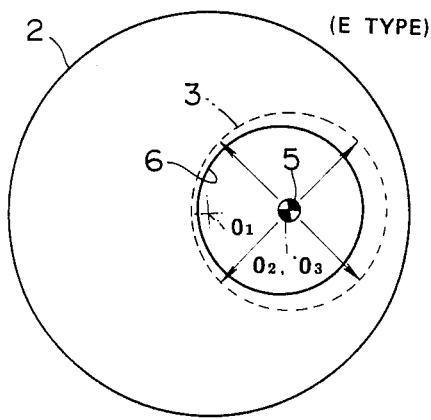
Figure 9:
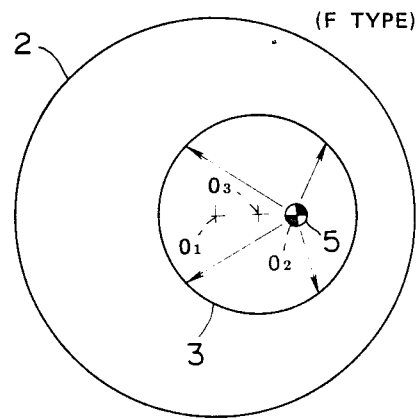
Figure 10:
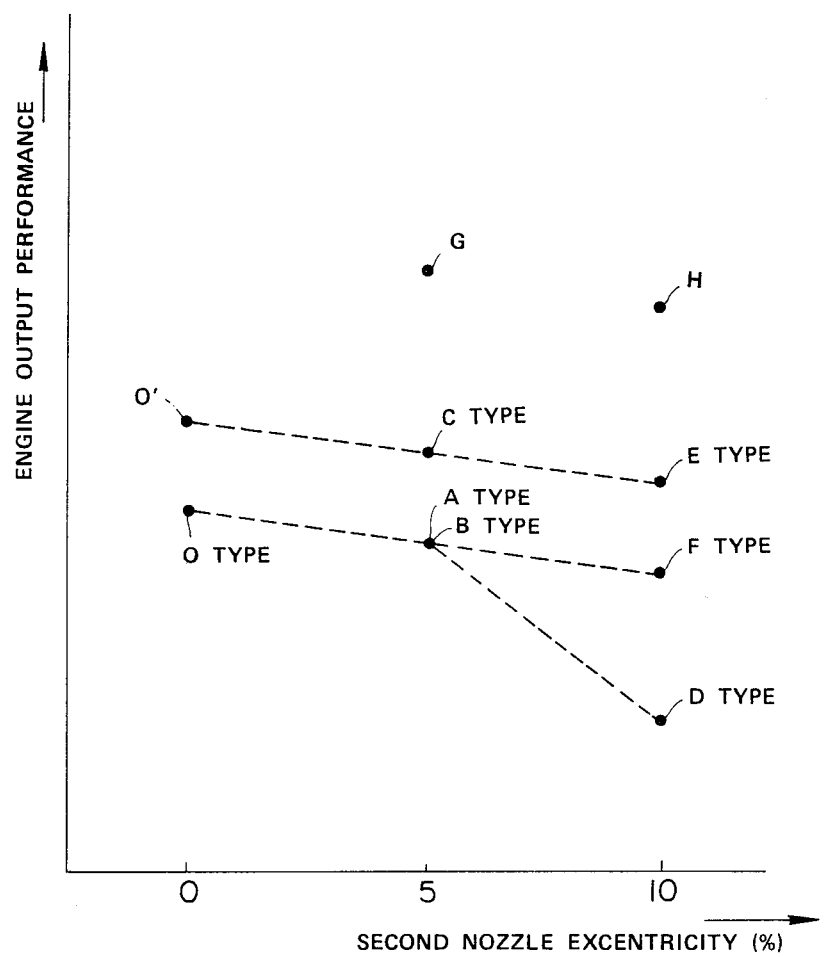
FIG. 10 is a graph which shows in terms of engine power output performance and "second nozzle eccentricity", the performance obtained with the various types of arrangements discussed in the instant disclosure.

The output performance of this embodiment is notably improved over all of the heretofore proposed arrangements as shown by point G in FIG. 10.

Figure 13:
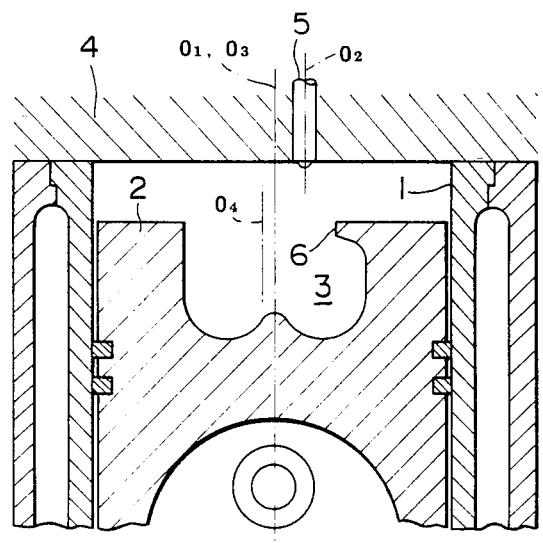
FIGS. 13 and 14 show a second embodiment of the present invention.
Figure 14:
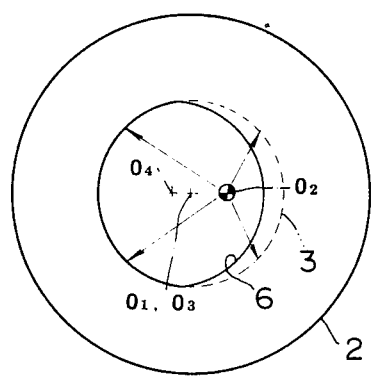

FIGS. 13 and 14 show a second embodiment of the present invention. This arrangement is essentially the same as the first embodiment and differs only in that the configuration of the lip 6 is such as to be arcuate and located essentially only on one side of the cavity. The casting of a piston provided with this type of lip is simplified as compared with that of the first embodiment.

Figure 15:
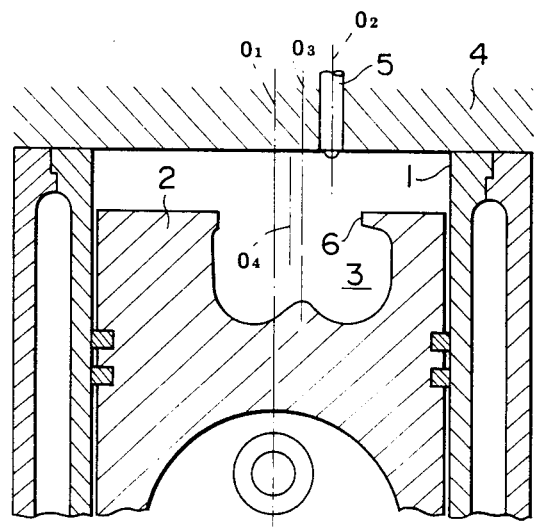
FIGS. 15 and 16 show a third embodiment of the present invention.
Figure 16:
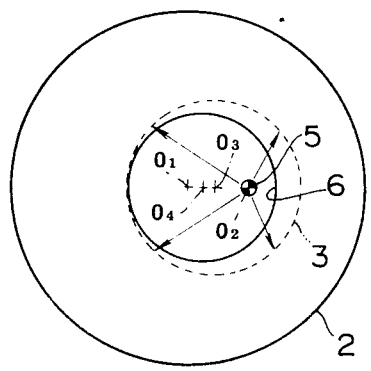

FIGS. 15 and 16 show a third embodiment of the present invention. In this arrangement the second nozzle eccentricity is greater than 6%, the axis of rotation of the cavity $O_3$ offset from cylinder bore axis $O_1$ in the direction of the fuel injection nozzle center $O_2$ in a manner that the three essentially lie on the same plane. The lip 6 is formed in a manner that the center thereof $O_4$ is offset from the cylinder bore $O_1$ in the direction of the fuel injector nozzle center $O_2$. This center, ($O_4$) as shown, also lies on or close to the aforementioned plane and intermediate of the cylinder bore axis $O_1$ and the axis of rotation of the toroidal cavity $O_3$.

With this embodiment, when the second nozzle eccentricity is within 11% and the first nozzle eccentricity within 12%, the cavity eccentricity can be as much as 6% and the power output performance greatly improved as shown by the point H in FIG. 10. It will be noted for the sake of comparison that the point O' in FIG. 10 denotes the performance obtained with a basic Saurer type arrangement which is provide with a symmetrical inwardly extending lip.

With the third embodiment, if the second nozzle eccentricity exceeds 11% and the first nozzle eccentricity is less than 12%, the cavity eccentricity cannot be rendered within 6%. This leads to a marked deterioration in performance characteristics. However, by increasing the fuel injection trajectory length and increasing the squish/reverse squish phenonmena, the demerits of this particular arrangement may be overcome thus permiting greatly increased design freedom of the type of offset arrangements to which the present invention is directed.

What is claimed is:

1. In an internal combustion engine means defining a bore having a bore axis, said bore axis lying in a first plane;

a piston reciprocatively disposed in said bore, said piston having a crown;

a fuel injector having a center, said center being offset with respect to said bore axis so as to lie in a second plane, said first and second planes being parallel to each other and normal to a line intersecting said bore axis and said center;

a cavity in said crown, said cavity having an axis of rotation which is offset from said second plane in a direction toward said first plane; and a curved inwardly extending lip formed about the upper periphery of said cavity, said lip having a center which is offset from said axis of rotation of said cavity.

2. An internal combustion engine as claimed in claim 1, wherein said internal combustion engine is a diesel engine, said cavity has a toroidal configuration and said fuel injector injects a plurality of jets of fuel at spaced intervals, said fuel injector being arranged with respect to said cavity so that at least one of the jets injected by said injector has a short trajectory and the remaining jets have longer trajectories.

3. An internal combustion engine as claimed in claim 2, wherein said lip is arranged to produce a squish and a reverse squish which causes turbulence in the region of said short trajectory and prevents fuel from impinging on and wetting the wall of said cavity.

4. An internal combustion engine as claimed in claim 3, wherein said lip is further arrranged to permit the reverse squish produced thereby to scavenge the finely atomized fuel produced by said jets having said longer trajectories out of said cavity.

5. An internal combustion engine as claimed in claim 1, wherein said first axis and said axis of rotation coincide.

6. An internal combustion engine as claimed in claim 1, wherein said first center is displaced from said first axis by a distance up to 6% of the diameter of said bore;

wherein said axis of rotation is displaced from said first center by a distance up to 12% of the diameter of said cavity; and wherein said axis of rotation is essentially coincident with said first axis.

7. An internal combustion engine as claimed in claim 1, wherein said first center is displaced from said first axis by a distance greater than 6% and less than 11% of the diameter of said bore;

wherein said axis of rotation is displaced from said first center by a distance up to 12% of the diameter of said cavity; and wherein said axis of rotation is displaced from said first axis by a distance up to 6% of the diameter of said bore.

* * * * *